United States Patent [19]

O'Donnell et al.

[11] 3,890,639

[45] June 17, 1975

[54] VIDEO TAPE RECORDING ANIMATION SYSTEM

[75] Inventors: Leopold Henry O'Donnell, Montreal; Robert Forget, St. Vincent de Paul; Youssef Hasrouni, Montreal, Canada

[73] Assignee: Her Majesty the Queen in right of Canada as represented by the Secretary of State, Ottawa, Canada

[22] Filed: June 8, 1973

[21] Appl. No.: 368,300

[52] U.S. Cl. ...................... 360/14; 360/35; 360/62; 360/72; 360/74

[51] Int. Cl. .. G11b 27/08; G11b 15/00; H04n 5/78

[58] Field of Search ........... 178/6.6 A; 179/100.2 B, 179/100.2 S, 100.2 MD, 100.2 T; 360/13, 14, 35, 71, 72, 74, 62

[56] References Cited

UNITED STATES PATENTS

| | | | |
|---|---|---|---|
| 3,180,930 | 4/1965 | Bounsall | 178/6.6 A |
| 3,342,932 | 9/1967 | Bounsall | 178/6.6 A |
| 3,575,552 | 4/1971 | Grant | 179/100.2 B |

*Primary Examiner*—Raymond F. Cardillo, Jr.
*Attorney, Agent, or Firm*—Alan Swabey; Robert E. Mitchell

[57] ABSTRACT

The invention relates to a system for controlling a video tape recorder in such a way that a selected number of frames can be recorded on a video tape in the recorder from a selected point on the tape. The selected point will usually be the last recorded frame on the tape. An audio signal is applied on the audio frequency portion of the video tape to or from a point adjacent to the last recorded video frame and for some distance on the tape ahead of or behind this point. When the tape is run in its forward direction, the start or cessation of the audio signal causes the onset of video recording. In addition, it actuates a counter which counts the number of video frames recorded. When the selected number of frames have been recorded, the counter provides an output to stop the video recording. The audio signal is applied when the tape is being rewound after the recording activity. It is, of course, necessary that the tape be positioned well behind the point at which video recording will commence to ensure that the tape will be at video recording speed when the end of the last recorded frame is adjacent the video recording head.

8 Claims, 7 Drawing Figures

VIDEO TAPE RECORDING ANIMATION SYSTEM

BACKGROUND OF THE INVENTION

1. Field of the Invention

This invention relates to a method for controlling a video tape recorder in such a way that a selected number of frames can be recorded on a video tape in the recorder, and to a system for carrying out the method. More specifically, this invention relates to such a method and system wherein an audio signal is impressed on the audio portion of the video tape to provide a control signal.

2. Description of the Prior Art

In presently available systems for recording a selected number of frames on video tape, digital information is recorded on the video tape, and the number of frames recorded is counted using this digital information.

The instant invention is a complete departure from this approach in that it requires no recording of digital information on the video tape for controlling the system.

SUMMARY OF THE INVENTION

In accordance with the invention, a method for controlling a video recorder in such a way that a selected number of frames of video information can be recorded, by video recorder means, on a video tape in said video tape recorder from a first position on the video tape on command, wherein the video tape comprising an audio frequency portion and a video frequency portion comprises:

impressing an audio signal on the audio frequency portion of said video tape;

positioning said video tape so that a second position on said video tape, a predetermined length behind said first position, is adjacent said video recording means;

moving said video tape in its forward recording direction;

detecting the audio signal on the audio frequency portion of said video tape while the tape is moving in its forward direction;

turning on the video recording means under the control of the audio signal and starting a count of frames elapsed after the turn on of the video recording means;

detecting a count corresponding to the selected number of frames; and turning off said video recording means when the count is detected.

A system for controlling a video tape recorder in such a way that a selected number of frames of video information can be recorded on command on a video tape, from a first position on the video tape, in said video tape recorder, wherein the video tape comprises an audio frequency portion and a video frequency portion, comprises:

video signal recording means;

means for positioning said video tape so that a second position on said video tape, a predetermined length behind said first position, is adjacent said video recording means;

means for impressing an audio signal on said audio frequency portion of said video tape;

means for moving the video tape in its forward recording direction;

means for detecting the audio signal on said audio frequency portion of said video tape while the tape is moving in its forward direction;

means actuated under the control of the audio signal to turn on the video recording means and to start a count of frames elapsed after the turn on the video recording means;

means for detecting a count corresponding to the selected number of frames; and means, actuated by said means for detecting the count for turning off said video recording means, when the count is detected.

BRIEF DESCRIPTION OF THE DRAWINGS

The invention will be better understood by an examination of the following description, togehter with the accompanying drawings, in which.

DESCRIPTION OF THE PREFERRED EMBODIMENTS

1. Background

In order to control a tape recorder in the desired manner, it is necessary to be able to perform the following functions:

a. To identify the point on the tape at which to start recording the selected number of frames. It is, of course, desirable that the further frames should follow the last recorded frame. Thus, it is necessary to identify the place on the tape corresponding to the end of the last recorded frame.

b. To initiate the beginning of video recording after the above-identified point.

c. To keep track of the number of frames recorded after the start of the recording activity.

d. To stop the recording activity after the selected number of frames have been recorded.

With the inventive system, an audio signal on the audio track of the video tape is used to both identify the end of a last frame and to initiate the start of recording. Either the start or finish of the audio signal can be used for this purpose. This signal will also be instrumental in starting a counter, and the counter output is compared with a preset count corresponding to the selected number of frames. When the output of the counter equals the preset count, a signal is provided to stop the video recording.

It is, of course, realized that, before video taping can commence, it is necessary that the tape be brought up to speed and be stabilized within the normal operating tolerance to permit recording a steady video image. This requires a certain length of tape for the run up, before the recording starts. In fact, if it were not for this requirement, then the frame-by-frame recording of video information would not present a difficult problem.

Thus, it is not only necessary that a point on the tape be identified, but it must also be ensured that the tape is at speed and stabilized when this point is reached and identified. This is accomplished, in the inventive system, by starting the tape up when the control point (the end of the last frame) is well behind th video recording head. When the control point reaches the video head, the tape will be at recording speed.

2. FIG. 1 Description

Figure 1A:
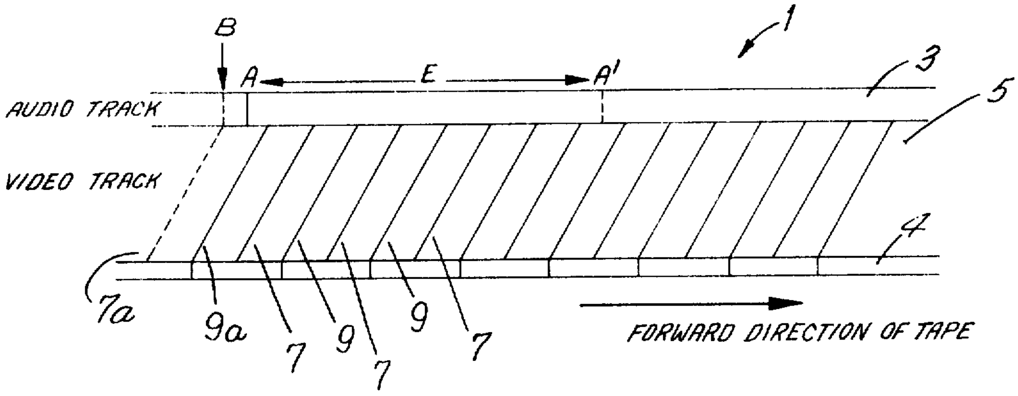
FIG. 1A illustrates a video tape for use in the inventive system.

FIG. 1A is a schematic illustration of a tape containing the control information. In this Figure, a video tape is generally referenced as 1 and comprises an audio track 3 and a video track 6. As is well known in the art, other special function tracks may also be included on the tape, such as control track 4.

The lines 7 and 9 represent recorded video fields on the tape. As is known, adjacent field lines 7 and 9 together make up a frame of video content. In FIG. 1, 9A represents the last field line in the last recorded frame. Thus, recording should commence after the dotted line B. In order to control this, an audio signal is recorded on the audio track to the right of and up to a point on the tape adjacent to the line B. Preferably, audio is impressed up to the point A, i.e., a point midway through the last field. As will be discussed below, the audio signal is impressed on approximately 8 seconds of tape to the right of the point A. The signal is impressed after the last frame has been recorded and while the tape is being rewound. In this respect, the tape is rewound after the recording cycle. Alternately, it can be rewound as the first part of the next recording cycle. The choice rests with the designer, and this will be discussed further below.

In any case, the tape now contains an audio signal impressed on the audio track for a length of approximately 8 seconds in advance of the control point. In addition, the tape is positioned such that the control point is some 8 seconds in behind the video record head.

Figure 1B:
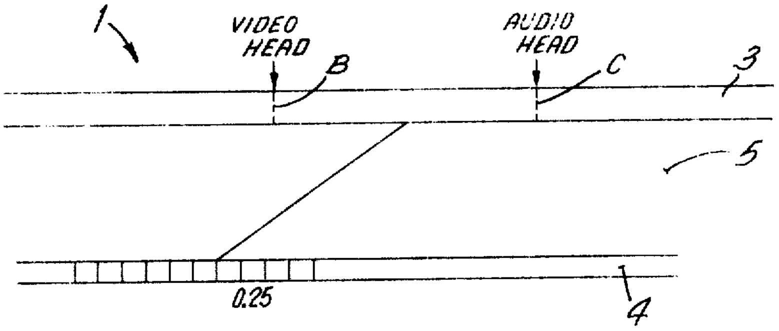
FIG. 1B shows the spatial relationship of the video and audio recording heads relative to the video tape.

In the actual physical situation, the audio record head is in advance of the video head in the forward direction of the tape as is shown in FIG. 1B. Thus, when the video record head is at B, the audio record head will be at C.

Figure 1C:
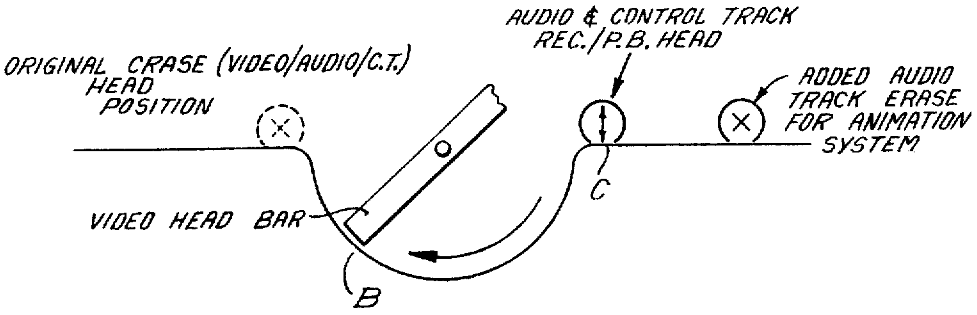
FIG. 1C is a schematic diagram of a physical system illustrating the above.

FIG. 1C, which is self-explanatory, illustrates schematically a physical system. The added erase head will be discussed below.

As illustrated, the end of the audio signal will initiate video recording. It will be appreciated that the audio signal can be impressed to the left of the point A within the scope of the invention. The start of the audio signal would, in this case, initiate video recording. In the further illustrative examples, we will consider only the case where the audio is impressed to the right of A.

Referring again to FIG. 1A, it is, of course, desirable that the first field to be recorded should be recorded at the position 7A.

Figure 2:
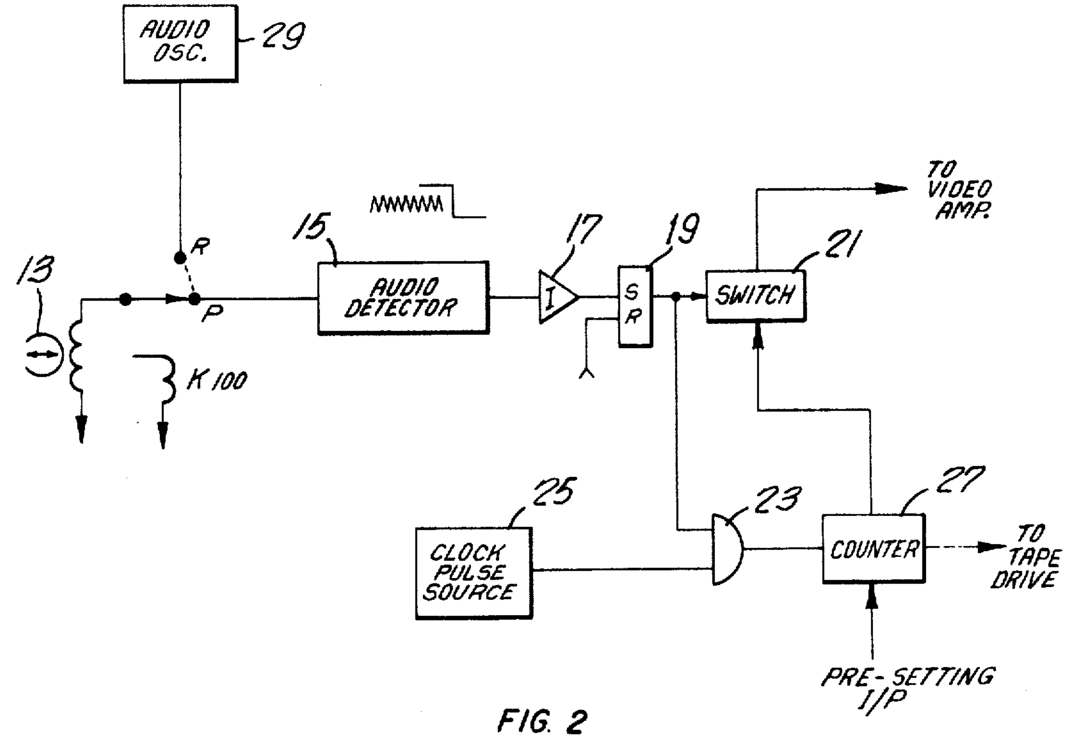
FIG. 2 is a block diagram illustrating the principles of the invention.

3. FIG. 2 Description

A system for using the audio control signal for the desired purpose is shown in FIG. 2. The system shown in FIG. 2 illustrates the basic concepts of the invention.

Referring to FIG. 2, audio record/playback head 13 is connected, via the contacts of relay K100, to either the audio detector 15 or the audio oscillator 29 depending on whether the switch is contacting the P or R terminals thereof. When the tape is being run up to its recording speed, the contacts are in the P position so that the record head is fed to the audio detector. The output of the audio detector is connected to inverter 17, and the output of the inverter is connected to RS flip-flop 19. The output of the flip-flop is connected to the turn-on terminal of switch 21 and to one terminal of the AND gate 23. The other output of the AND gate is connected to a clock pulse source 25, and the output of the AND gate is connected to a counter 27. The clock pulse source 25 will preferably comprise the vertical sync generator of the recorder or will comprise a clock generator synchronized by the output of the vertical sync generator.

The audio signal impressed on the audio track of the video tape is detected by the detector 15 and the output of the detector is inverted by the inverter 17. When the end of the audio signal is reached ($t_0$ in FIG. 2), the output of the inverter will be a positive going signal which will set the RS flip-flop 19 to thereby provide a turn-on signal to switch 21. This, in turn, will turn on the video record amplifier so that video taping can begin.

At the same time, the RS flip-flop will open the gate 23 so that clock pulses can be fed to the counter 27. The clock pulses are preferably supplied at the frame rate so that each time a pulse is fed to the counter, it will count one frame.

The counter is pre-set to the desired number of frames so that, when the desired number of frames have been counted, the counter will supply a signal to the switch 21 to turn it off. This, in turn, will turn off the video record amplifier so tht video recording will cease after the desired number of frames have been recorded. The counter will also supply a signal to the tape drive to cause the motor of the tape drive to stop, to reverse the direction of the motor, to rewind the tape, and then to have the motor ready to drive the tape in its forward direction when a forward button is again activated. The cycle will then repeat.

When the tape is being rewound, the contact of relay K100 will be in its R position, and the audio oscillator will be turned on, so that an audio tone will be impressed on the audio track of the tape by the record/-playback head 13.

The audio oscillator is switched on during the reverse run by a signal derived from the RF section of the video playback circuits. This is the device which senses and locates the last recorded frame.

4. Description of Practical Embodiments of FIGS. 3, 4 and 5

Figure 5:
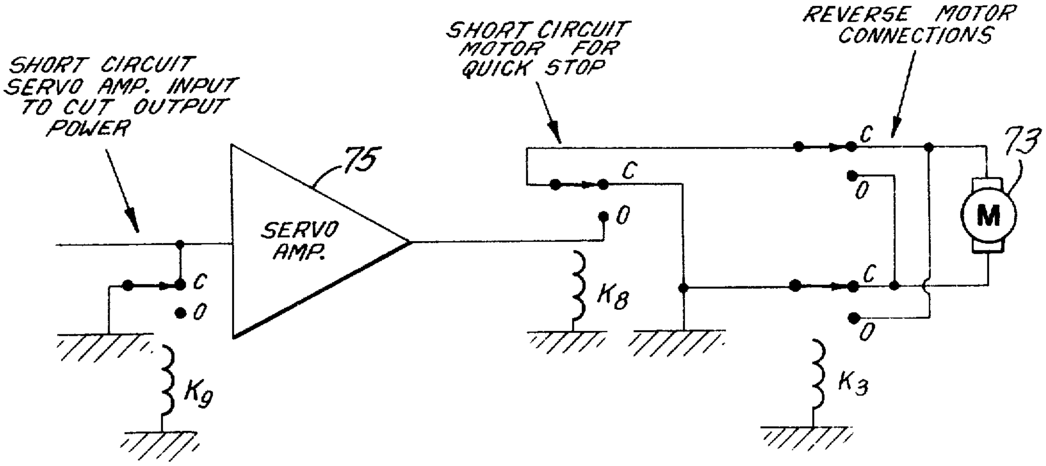
FIG. 5 illustrates the tape drive motor connections in accordance with the invention.
Figure 3:
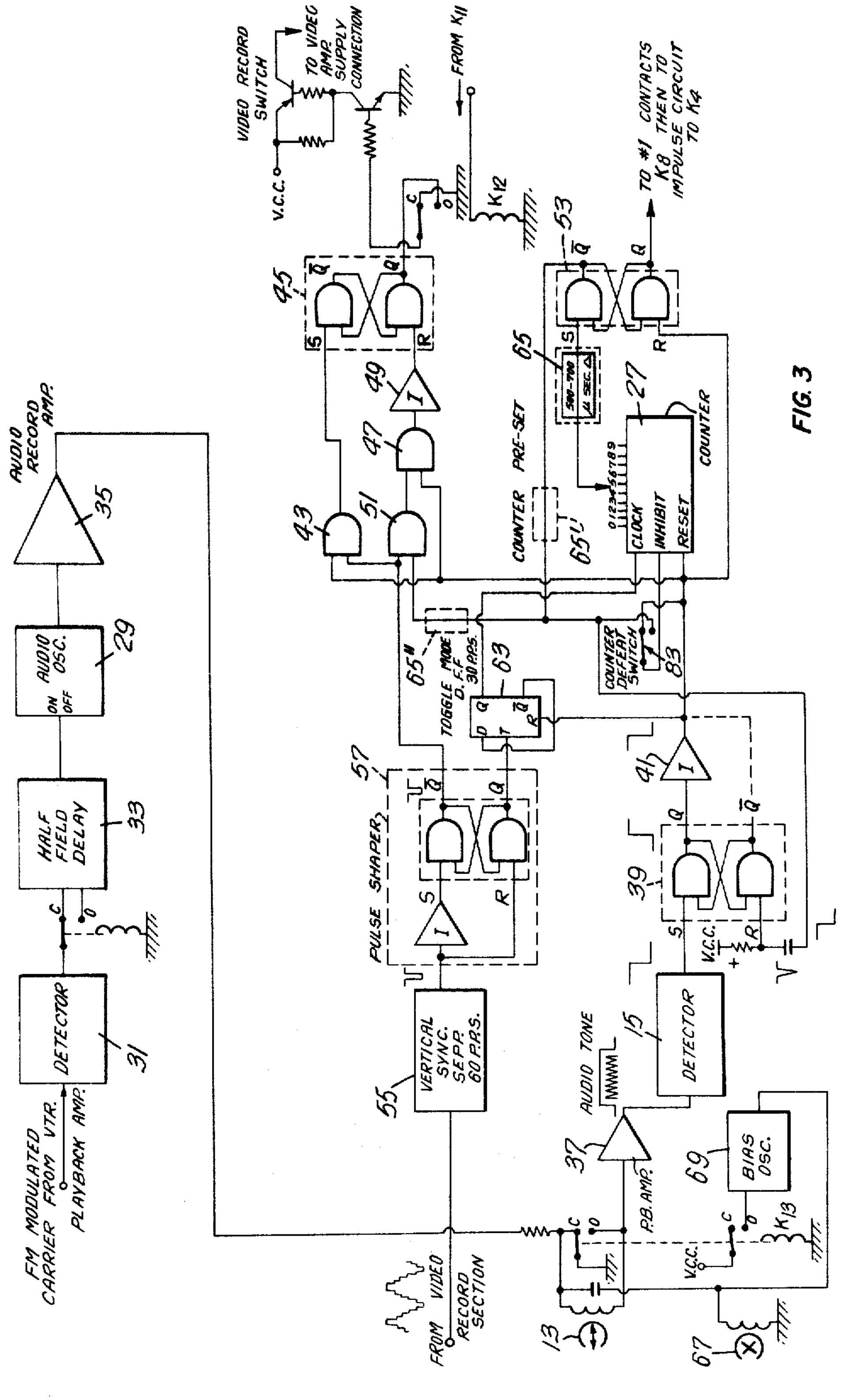
FIG. 3 is a schematic diagram of a preferred embodiment of the invention.
Figure 4:
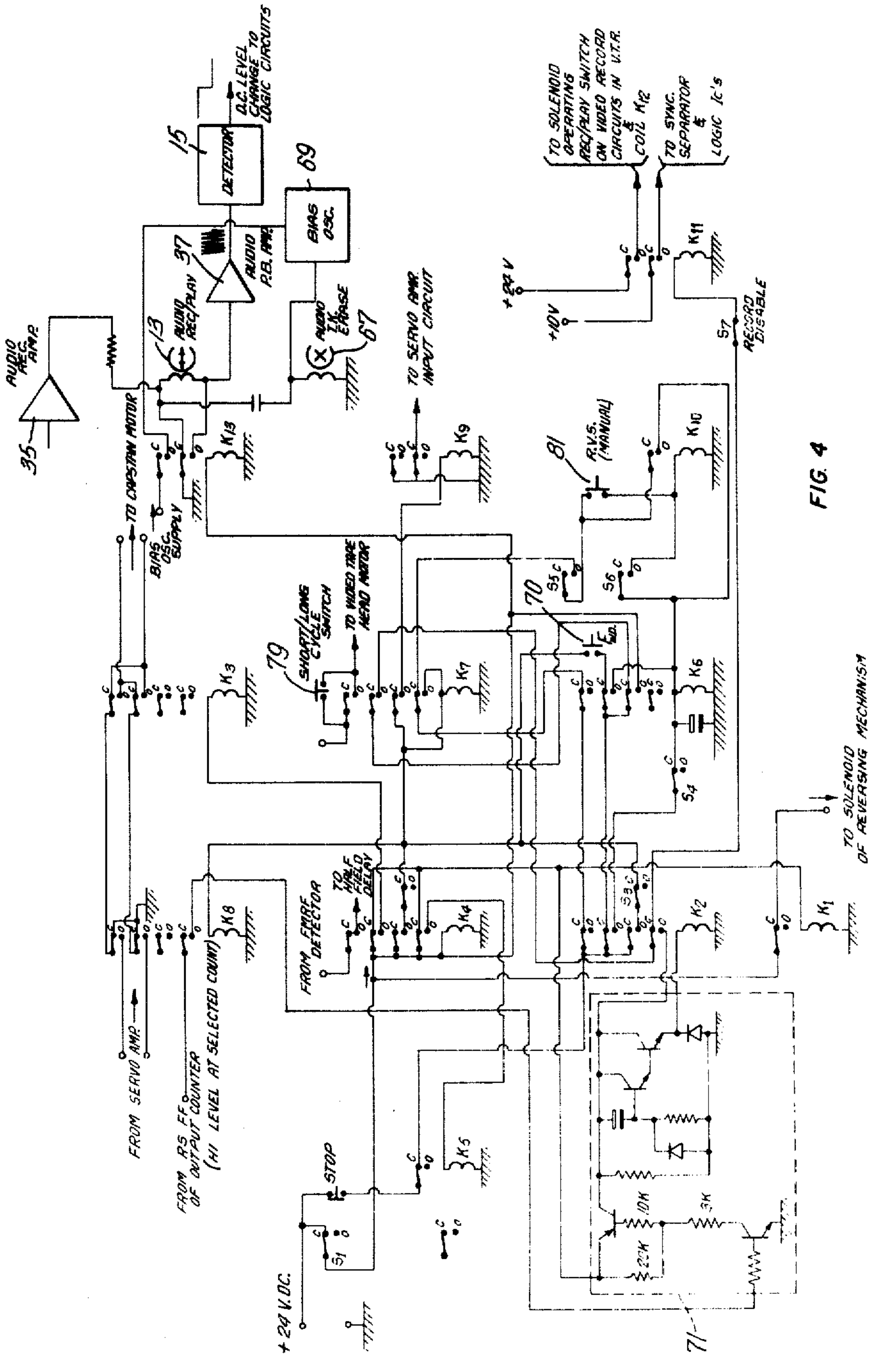
FIG. 4 is a circuit diagram of the relays controlling the operation of the tape recorder elements in accordance with the invention.

A practical system for implementing these functions is illustrated in FIGS. 3, 4 and 5. All dual input gates used in this model are of the type requiring that both inputs be low to provide a high output as an AND function, except device 39 which is of the opposite type, i.e., requiring both input high to produce a low output forming a NAND function. These are in the Complementary Metal Oxide Semiconductor type circuits.

Referring first to FIG. 3, RF detector 31 has its input connected to the output of the VTR playback amplifier. The output of the detector is connected, through relay K4 to the half field delay 33 whose output is connected to the ON/OFF control terminal of audio oscillator 29. The output of the oscillator is connected to amplifier 35 which feeds audio record/playback head 13 when the contacts of relay K13 are in the 0 position.

When K13 is in the C position (as shown), the output from 35 is shorted to ground and the head 13 is in its playback mode. In this position of K13, the output from the playback head is fed to the playback amplifier 37 which feeds audio detector 15.

The output of the detector provides an activating pulse on the cessation of the audio signal to RS flip-flop 39, whose Q terminal is fed, through inverter 41, to the RESET terminal of the clock 27, as well as to one terminal of the AND gates 43 and 47. Output of gate 43 is fed to the SET terminal of RS flip-flop 45 whose RESET terminal is fed from AND gate 51 through AND gate 47 and inverter 49.

The selected output terminal of the counter 27 is fed to delay device 65 which provides an output to the SET terminal of RS flip-flop 53. The $\overline{Q}$ output of 53 is connected to the other input of gate 51, and the Q output is connected to a contact of relay K8 (see FIG. 4).

The vertical sync separator 55 receives an input from the video record section of the recorder and separates the vertical sync pulses the therefrom. These pulses are fed to the pulse shaper 57, which comprises an inverter 59 and an RS flip-flop 61, to sharpen the edges of the pulses, and the sharpened pulses are fed from one output of the pulse shaper to an input terminal of both gates 43 and 51. The other output of the pulse shaper is applied to the D flip-flop 63 which is operated in its toggle mode. The flip-flop 63 merely acts as a divide by two flip-flop to translate the field pulses (at 60 pps — the field rate) from the pulse shaper to frame pulses (at 30 pps — the frame rate) at the clock input to the counter.

It will be appreciated that the system will operate for a unit with a frame rate of 24 frames per second. In this case, the output of 63 would be 24 pps.

The RESET terminal of RS flip-flop 45 will switch on the video record switch when the contacts of relay K12 are in the 0 position.

FIG. 4 illustrates the relay arrangement for providing power to the tape drive motor, for stopping the motor, for reversing the motor, and for running the motor in reverse to rewind the tape. The interconnections can be seen by any examination of the diagram and will be discussed when discussing the operation of the system. The system consists of relays K1 to K13 of which relays K1, K2, K4 and K6 are delay relays with 2 second delays, while K5 is a delay relay with a 10 second delay, and K11 has a delay of some 6 seconds. FIG. 4 also contains other special function switches which will be discussed in the description of the operation.

The contacts of the relays are shown in FIG. 4 as they are when the coils of the relays are unenergized. Thus, the C positions of the contacts are the positions of the contact of unenergized relays, while the 0 positions are the positions of the contacts of energized relays.

FIG. 5 is a schematic diagram of the control circuit for the tape drive motor and includes DC motor 73 and servo drive amplifier 75 which provides the driving power to the motor.

5. Operation of Practical Embodiment

Assuming once again that audio has been impressed on the audio track of the video tape, operation will commence when the FWD button 70 is depressed (see FIG. 4). This will energize relay K7, which in turn will energize relay K9. Pressing the forward button will also energize K8 so that the servo amplifier is connected to the motor through K8 and the ground is removed from the signal source at the input to the servo through the action of K9. As a result, the tape will be driven in the forward direction. K13 is not energized so that playback head 13 will be connected to the PB amplifier 37 in FIG. 3.

When K7 is energized, power will also be supplied to the coil of K11 through the contacts of K2. However, as there is a 6 second delay associated with K11, its contacts will not move immediately. When K11 is in its unenergized state, K12 will be unenergized so that power cannot be supplied to the video record switch. In addition, the video recorder will be in its playback mode so that the frames already can be viewed.

When K11 is energized, power is supplied to the coil of K12 so that the video record switch is primed to be turned on. In addition, the video circuits are switched from the playback to the record mode, and power is supplied to the sync separator 55 as well as the logic IC's preparing them for operation. It will be noted that K11 is energized some 2 seconds before video recording commences to permit the system to stabilize before the moment of switching.

As previously arranged, a tone will appear on the audio track at least until the tape is at recording speed. Some time after this (in the illustrated system, some 8 seconds after the tape starts moving in the forward direction), the audio tone will cease. This will occur when the audio playback head is adjacent the point C in FIG. 1B. At this time, of course, the video playback head will be adjacent the point A in FIG. 1A (i.e., a half field before the last frame. The reason for the half field delay is discussed below.)

Referring now to FIG. 3, when the audio tone ceases, the detector 15 will provide a negative going signal to the RS flip-flop 39 which will set this flip-flop and provide a positive going output at its Q terminal. When this positive going output is inverted in the inverter 41, it will remove the reset from the counter 27 so that the counter will be enabled and will start counting pulses from the D flip-flop 63. At the same time, the output of the inverter 41 will open gate 43 to the next pulse from the pulse shaper 57. Thus, when a pulse is supplied from the $\overline{Q}$ output of 57, it will set RS flip-flop 45, to provide a low level at the Q output thereof. As K12 is energized, the low level will be transmitted to the video record switch which will turn on the switch so that video recording can commence.

The output of inverter 41 will also provide a signal to gate 47 to ensure that RS flip-flop 45 acquires the RESET mode when the output of the inverter is high.

As the flip-flop 63 is fed from the Q output of the pulse shaper, it will not provide any pulses to the counter until after the video record amplifier has been turned on. As the output of 63 is at the frame rate, the counter will be counting frames elapsed since the turn on of the video amplifier.

The Counter Defeat Switch 83, in the Inhibit line of the counter 27, operates to prevent the counter from starting a count, or for interrupting the count of the counter. Thus, if it is desired to record for, say, 10 seconds plus a predetermined number of frames, the counter would be set for the predetermined number of frames and the counter defeat switch button would be depressed for 10 seconds after the video recorder starts recording. Depressing the switch removes the low level at the output of 41 from the inhibit terminal and places the high level at the $\overline{Q}$ output of 53 at the inhibit terminal so that the counter is inhibited from counting. When the button is released, the counter will start counting, assuming that 39 is already SET.

Returning to normal operation, the counter will have been set to the desired number of frames. In FIG. 3, the counter has been pre-set to 6, i.e., it was desired to record 6 frames after the end of the last recorded frame. When 6 pulses have been supplied to the counter from the flip-flop 63, the terminal 6 of the counter will be high. This high level will be applied to the SET terminal of RS flip-flop 53 (through the delay 65, the purpose of which will be discussed below), so that a low level will appear at the $\bar{Q}$ output terminal of the flip-flop, and a high level will appear at the Q output terminal.

The output from the $\bar{Q}$ output terminal of RS flip-flop 53 is fed to one terminal of gate 51 to gate it open to the next pulse from the pulse shaper 57. As gate 47 was gated open when the audio signal stopped, the next pulse will pass through to the inverter 49 and, at the output of the inverter, it will provide a signal to the RESET terminal of RS flip-flop 45. This will change the state of 45 to turn off the video record switch so that video recording will cease at the end of the selected number of frames, i.e., at the end of six frames in the FIG. 3 illustration.

At the same time, an output will be supplied from the Q output terminal of the RS flip-flop 53 to relay K8. K8 was, of course, energized when the tape started moving in the forward direction so that its contacts are in the 0 position. Referring now to FIG. 4, the output from 53 is fed, through K8 and stop circuit 71, to energize the coil of relay K2. The stop circuit delivers a 2 second impulse to the coil of K2 so that it will be energized only for a period of 2 seconds after the signal is provided to the input of circuit 71.

During the 2 second period, K7 and K8 are held on by power supplied through another set of contacts of K2. K6 will be energized and will latch during this time thus breaking the original connections to K7 and K8. Thus, when K2 releases, K6 remains latched so that K7 and K8 will release.

When K7 is released, K9 will also be released so that the input signal to the servo amplifier 75 is shorted to ground as can be seen in FIG. 5.

When K6 is energized, power will be supplied to the coils of K4 and K13. K4 has a 2 second delay associated with it, so that the contacts of its coils will not move until 2 seconds after the energizing signal is supplied from K6. When K4 is energized, it will connect the RF detector 31 to the half field delay 33 as can be seen in FIG. 3. When K13 is energized, it will activate the bias source 69 connected to the erase head 67, and it will also put the record head 13 in the record mode by removing the ground from the output side of the audio record amplifier 35 and putting it on the other side of the audio record head 13.

The erase head 67 erases the audio signal remaining on the audio track just before a new audio signal is impressed. Thus, the bias oscillator is not connected to the erase head while the tape is advancing in its forward direction. The erase head is physically located ahead of the record head so that, when the tape is moving in the reverse direction, the erase head precedes the record head.

Thus, the audio track will be erased just before an audio signal is impressed on the audio track. This will leave a clean track for recording. However, as some of this function is performed by the audio record head just before recording, it can be seen that the erase head is not a necessary feature of the invention, but is a preferred improvement.

When K4 is energized, power will also be applied to the coils of K3 and K7 and K8. When K3 is energized, its contacts will move to the 0 position so that the tape drive motor will be connected to drive the tape in its reverse direction as can be seen in FIG. 5. When K8 is energized, the output of the servo amp 75 will once again be connected to the motor 73, as shown in the same Figure The energization of K7 will cause the energization of K9 which will connect the input of the servo amp 75 to its signal so that the tape will now be driven in its reverse direction.

When the tape starts to rewind, as the detector 31 is connected to the FM modulated carrier playback amplifier, it will detect signals recorded on the tape. As, in the forward cycle, the tape advanced some 2 seconds past the last recorded frame, the tape will rewind for some two seconds before there is any output from the detector. After the blank rewind period, the first signal which the detector 31 will detect is the last recorded pulse. This pulse, after a half field delay due to 33 of FIG. 3, will activate the audio oscillator 29 so that an audio signal will be supplied to the audio record head and the audio signal will be impressed on the audio track of the video tape while the tape is rewinding.

The half field delay device 33 ensures that the recording of the audio signal will not start until a half field ahead of (before) the end of the last recorded frame, i.e., point C in FIG. 1B.

As the video recording circuits are switched on during the vertial pulse, the mid field position allows adequate tolerance in the audio control channel which has longer time constants due to the lower frequency involved. Furthermore, the angular position of the video head drum is not under servo position control because there are no vertical pulses from the unrecorded section of the tape and, therefore, the exact location of the switching signal to the audio oscillator is not very precise.

We can now understand the reason for the 700 usec delay device 65 in FIG. 3. If the system stopped recording immediately on the pulse signifying the last frame, then only a very narrow part of this pulse would be recorded. This narrow pulse could be insufficient to turn on the audio oscillator, and, if it failed to do so, the timing would, of course, be upset. By inserting the delay, we ensure a wide enough pulse to turn on the audio oscillator each time. Thus, the delay could also be placed at 65', or 65" shown in dotted lines in FIG. 3.

K1 controls the reverse take-up solenoid. Its function is maintained reverse take-up tension for a few seconds after stopping in reverse. This relay is energized at all times when power is on the control box. The solenoid is connected to its normally closed contacts. The relay releases for reverse, and energizes the solenoid. At the end of the reverse run, the delay relay is energized again and is activated after its pre-set delay. This holds take-up tension for a short period, preventing the tape from becoming loose and falling off the drum.

K7 will also, when energized, provide power to the motor driving the video tape head. When de-energized, the power will be cut off so that the video tape head will stop rotating. When power is again applied, a certain period of time will elapse before the head is at recording speed. In some cases, it may be more convenient if the video tape head keeps rotating even when all other parts of the system have stopped and, for this purpose, short/long cycle switch 79 is provided. As can be seen in FIG. 4, when this switch is closed, power will be supplied to the motor driving the video tape head drum regardless of the state of the relay K7.

To return to the main stream, when K4 is energized, power will also be supplied to the coils of K5. As this relay has a delay of 10 seconds, the contacts of this relay will not move until 10 seconds after power is applied to the coils, i.e., 10 seconds after the tape started advancing in the reverse direction. When the contacts of K5 move to their 0 position, power will be removed from all relays so that all relay contacts will return to their C position. When this happens, the tape drive motor will stop and the motor connections will be returned to the forward drive mode.

Additionally, the bias oscillator 69 will be deactivated, and the audio record/playback head will be reconnected into the playback mode. Again, the RF detector 31 will be disconnected from the half field delay 33. Finally K5 will be de-energized so that the power line will again be complete and waiting for the next depression of the forward button 70 to start the cycle again.

6. Other Features

Other preferred, but not necessary, features shown in FIG. 4 include:

Switches S1–S6

These switches are physically one switch unit with 6 connections. The switch permits the recorder to be used in either the manual or the animation modes. As shown in FIG. 4, the recorder is in the animation mode.

Reverse-Manual Switch 81

This switch permits the recorder to be run in reverse when switched to the manual mode. When this switch is depressed, it will energize K10 which will, in turn, provide power to the coils of K3, K7, K8 and K9, whereby the tape drive motor will be driven in reverse.

Playback Only Safety Switch S7

This switch is provided in the line to the coil of K11 to permit the system to operate without activating the recording circuits.

This is a necessary feature because a 30 pulse per second control track is pre-recorded throughout the full reel of tape before beginning animation work. This provides a steady reference for positioning the tape and the video head drum in accordance with the incoming video signal and ensures good tracking of the video recording at all times.

In this design the record circuits of the V.T.R. are switched into operation with the aid of a solenoid energized through the contacts of K11. The control track record circuits are switched manually and remain under the control of the original record function switch on the deck of the machine. To pre-record the control track, it is only necessary to set the "record disable" switch and run the tape with the control track recording circuits activated by means of the record button on the V.T.R. machine.

The record disable switch should also be used during playback only to ensure that the equipment is not switched into record mode as a result of no audio control track combined with unexpected incoming video. After recording the control track and before commencing the animation, a number of frames of video must be recorded to create a starting point for the cycle of operations. This must be done when the machine has attained operating speed and stabilized. There being no audio signaling track yet laid down, the machine will immediately go into record and then switch off at the selected count, before the machine has stabilized. This is overcome by starting with the "record defeat" switch in the off state until the machine is up to speed.

We claim:

1. A method for controlling a video tape recorder in such a way that a selected number of frames of video information can be recorded, by video recorder means, on a video tape in said video tape recorder from a first position on the video tape on command;

said video tape comprising an audio frequency portion and a video frequency portion;

said method comprising:

positioning said video tape so that a second position on said video tape, predetermined length behind said first position, is adjacent said video recording means;

impressing an audio signal on said audio frequency portion of said video tape along the predetermined length of said video tape;

moving said video tape in its forward recording direction;

detecting the audio signal on the audio portion of said video tape while the tape is moving in its forward direction;

turning on the video recording means after the cessation of the audio signal and starting a count of frames elapsed after the turn on of the video recording means;

detecting a count corresponding to the selected number of frames; and turning off said video recording means when the count is detected.

2. A system for controlling a video tape recorder in such a way that a selected number of frames of video information can be recorded on a video tape in said video tape recorder, from a first position on the video tape, on command;

said video tape comprising an audio frequency portion and a video frequency portion;

said system comprising:

video signal recording means;

means for positioning said video tape so that a second position on said video tape, a predetermined length behind said first position, is adjacent said video recording means;

means for impressing an audio signal on said audio frequency portion of said video tape along the predetermined length of said video tape;

means for moving the video tape in its forward recording direction;

means for detecting the audio signal on said audio frequency portion of said video tape while the tape is moving in its forward direction;

means actuated by the cessation of the audio signal to turn on the video recording means and to start a count of frames elapsed after the turn on of the video recording means;

means for detecting a count corresponding to the selected number of frames; and means, actuated by said means for detecting the count for turning off said video recording means, when the count is detected.

3. A system as defined in claim 2, wherein said means for positioning said video tape comprises means, actuated by the means for detecting the count when the count is detected, for moving the tape in its reverse direction.

4. A system as defined in claim 2, wherein said video signal recording means is a video record/playback head.

5. A system as defined in claim 2, wherein said means for positioning said video tape and said means for moving the video tape in its forward direction both together comprise a reversible DC tape drive motor.

6. A system as defined in claim 2, wherein the means for impressing an audio signal comprises an audio record/playback head adjacent the audio frequency portion of the video tape, said audio head being turned on when said means for moving the tape in its reverse direction starts moving the tape in its reverse direction, and said audio head being turned off when the second position of said video tape is adjacent said video recording means.

7. A system as defined in claim 6, wherein said audio record head is connected to an audio oscillator when in its record mode, and to an audio detector, which comprises the means for detecting an audio signal, when in its playback mode.

8. A system as defined in claim 7, wherein said means for detecting a count comprises a decoded counter having a clock terminal;

said system further comprising means for providing vertical sync pulses of said tape recorder to the clock terminal of the counter;

and means for pre-setting the counter to a desired count;

the output of said audio detector being connected to said counter to actuate its counting mode.

* * * * *